E. J. AITKEN.
CHAINLESS NON-SKID DEVICE.
APPLICATION FILED JULY 13, 1917.
1,256,420.
Patented Feb. 12, 1918.
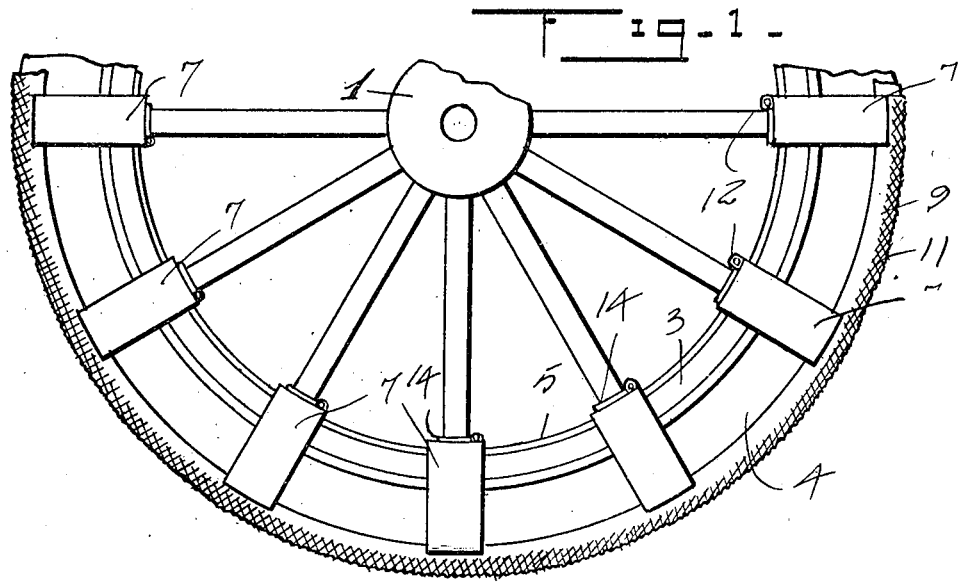
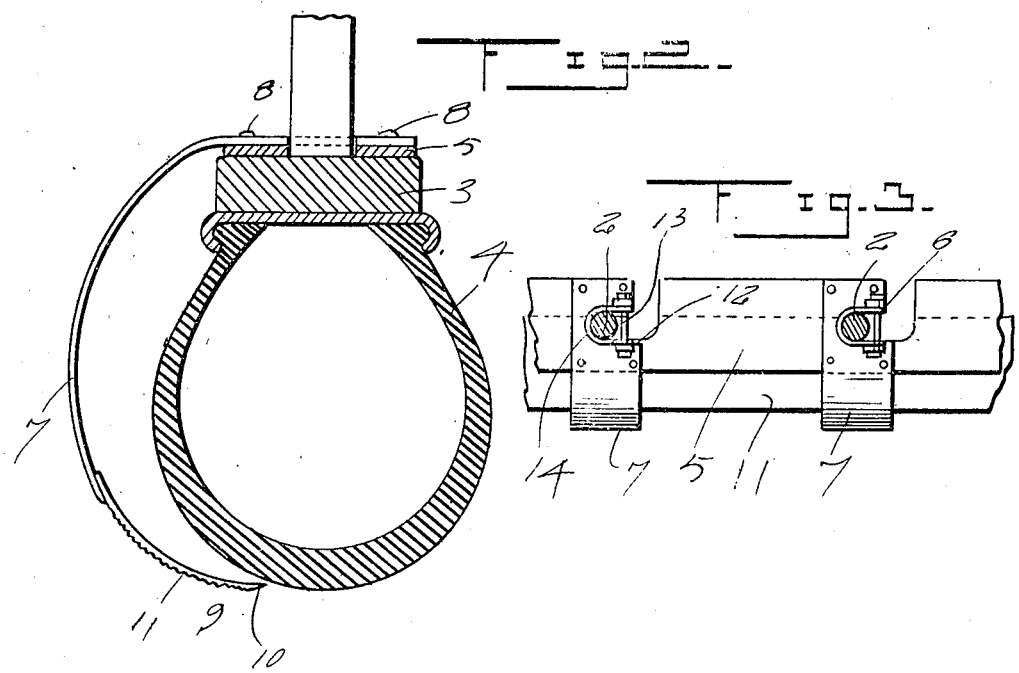
Inventor
E. J. Aitken

UNITED STATES PATENT OFFICE.

EDWIN J. AITKEN, OF PASCO, WASHINGTON.

CHAINLESS NON-SKID DEVICE.

1,256,420.  Specification of Letters Patent.  Patented Feb. 12, 1918.

Application filed July 13, 1917. Serial No. 180,398.

*To all whom it may concern:*

Be it known that I, EDWIN J. AITKEN, a citizen of the United States, residing at Pasco, in the county of Franklin and State of Washington, have invented certain new and useful Improvements in Chainless Non-Skid Devices; and I do hereby declare the following to be a full, clear, and exact description of the invention, such as will enable others skilled in the art to which it appertains to make and use the same.

This invention relates to improvements in a non-skid device for automobiles and has for one of its objects the provision of a device of this character, which can be readily and conveniently applied to the wheels of an automobile for the purpose of preventing them from skidding.

Another object of this invention is the provision of a tread member located adjacent the tread of a tire and adapted to move over the tread of the tire when the automobile starts to skid, and which will bite into the ground or pavement to prevent further skidding of the automobile.

A further object of this invention is the provision of a plurality of resilient arms detachably secured to the felly of a wheel and secured to the tread member for supporting said tread member adjacent the tread of the tire and in engagement with the ground so that upon lateral movement of the tire, it will pass upon the tread member and be prevented from skidding.

A still further object of this invention is the provision of a non-skid device for automobiles of the above stated character, which shall be simple, durable and efficient, and which may be manufactured and sold at a comparatively low cost.

With these and other objects in view, as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:

Figure 1 is a fragmentary side elevation of a non-skid device for automobiles constructed in accordance with my invention, Fig. 2 is a transverse sectional view of the same, Fig. 3 is a fragmentary sectional view illustrating the means of removably securing the resilient arms to the spokes and felly of a wheel, Referring in detail to the drawing, the numeral 1 indicates the hub of a wheel having the usual spokes 2 to which is secured the felly 3. The felly 3 has mounted thereon, the usual pneumatic tire 4. The foregoing description relates to a well known construction of automobile wheel and to which my invention is applied.

A band 5 is provided with a plurality of bayonet slots 6 for receiving the spokes 2 so as to position the band 5 upon the inner face of the felly 3. A plurality of substantially arcuate shaped resilient arms 7 are bolted or otherwise secured to the band 5 as shown at 8 and have secured to the free ends thereof, a concave tread member 9, which tread member has one edge thereof beveled as at 10 and located adjacent the tread of the tire 4, as clearly shown in Fig. 2. A portion of the outer face of the tread member 9 is provided with serrations 11 to present a roughened tread face to the member 9. The resilient arms 7 are of such shape and length that they will normally hold the edge 10 of the tread member 9 into engagement with the ground at a point adjacent the tread of the tire 4 so if the tire 4 skids upon the ground, it will pass upon the tread member 9 and the serrations 11 will bite into the ground or pavement to prevent skidding of the tire.

The resilient arms 7 have slots therein to receive the spokes 2 and which are in communication with the bayonet slots 6 and have formed thereon, oppositely disposed lugs 12 to receive bolts 13. The bolts 13 secure substantially U-shaped clamps 14 to the lugs 12 and which clamps pass about the spokes 2 for removably or detachably securing the band 5 to the spokes and felly 3.

While I have shown and described the preferred embodiment of my invention, it will be understood that minor changes in construction, combination and arrangement of parts may be made without departing from the spirit and scope of the invention as claimed.

Having thus described my invention, what I claim is:

1. In combination with a wheel including a felly having a tire mounted thereon, of a concave tread member located adjacent the tread surface of the tire, resilient arms secured to the tread member and extending over the inner face of the felly, and a circular means overlying the inner face of the felly for detachably securing the resilient arms to the felly.

2. In combination with a wheel including a felly having a tire mounted thereon, and spokes, of a tread member located adjacent the tread of the tire, arms secured to the tread member and overlying the inner face of the felly, and a band secured to the inner ends of the arms and having bayonet slots to receive the spokes.

3. The combination with a wheel including a felly having a tire mounted thereon and spokes, of a tread member located adjacent the tread of the tire, arcuate shaped resilient arms secured to the tread member and extending over the inner face of the felly, a band overlying the inner face of the felly and secured to the inner ends of the arms, said band having bayonet slots to receive the spokes, and clamps carried by the band and surrounding the spokes for removably securing the band to the wheel.

In testimony whereof I affix my signature in presence of two witnesses.

EDWIN J. AITKEN.

Witnesses:
EDW. H. SCHMIDTMANN,
FLORENCE WELSH.

Copies of this patent may be obtained for five cents each, by addressing the "Commissioner of Patents, Washington, D. C."